United States Patent [19]

Aaronson et al.

[11] Patent Number: 5,109,047
[45] Date of Patent: Apr. 28, 1992

[54] PLASTICIZATION OF POLYVINYL CHLORIDE WITH CARBON MONOXIDE-PROPYLENE COPOLYMER

[75] Inventors: Alan M. Aaronson, Flushing Meadows; Jagadish C. Goswami, New City; Andrzej M. Piotrowski, Peekskill; Gurudus D. Sinai-Zingde, Ossining, all of N.Y.

[73] Assignee: Akzo NV, Arnhem, Netherlands

[21] Appl. No.: 595,060

[22] Filed: Oct. 10, 1990

[51] Int. Cl.⁵ ............................................. C08J 3/21
[52] U.S. Cl. ................................................. 524/357
[58] Field of Search .......................... 525/185; 524/357

[56] References Cited

U.S. PATENT DOCUMENTS 3,780,140  12/1973  Hammer .............................. 525/185

FOREIGN PATENT DOCUMENTS 2433722  1/1976  Fed. Rep. of Germany ...... 525/185

OTHER PUBLICATIONS

Robeson et al, Polym. Eng. & Science, vol. 17, pp. 300-304 (1977).

Primary Examiner—Paul R. Michl
Assistant Examiner—Tong Lee
Attorney, Agent, or Firm—Richard P. Fennelly; Louis A. Morris

[57] ABSTRACT

Polyvinyl chloride resin can be plasticized with a carbon monoxide-propylene copolymer. Since the copolymer is soluble in organic solvent, it and the polyvinyl chloride can be dissolved in an organic solvent and then cast to form a film. The copolymer can be a liquid, relatively low molecular weight material, which can be heat blended with the resin along with a smaller amount of a conventional external plasticizer for the resin.

6 Claims, No Drawings

PLASTICIZATION OF POLYVINYL CHLORIDE WITH CARBON MONOXIDE-PROPYLENE COPOLYMER

BACKGROUND OF THE INVENTION

Various disclosures exist in the prior art relating to the mixing of polyvinyl chloride resin with polymers formed from carbon monoxide and other copolymerizable monomers.

U.S. Pat. No. 3,780,140 to C. F. Hammer describes the use of "certain" copolymers of 40-80% ethylene, 10-60% vinyl acetate and 3-30% carbon monoxide as a blending resin with polyvinyl chloride resin.

L. M. Robeson et al., Polymer Engineering and Science, May 1977, Vol. 17, No. 5, pp 300-304 indicates that an ethylene-vinyl acetate-carbon monoxide terpolymer as well as an ethylene-2-ethylhexyl acrylate-carbon monoxide terpolymer exhibited miscibility with polyvinyl chloride.

German Patent Publication No. 2,433,722 shows the mixing of solid polyvinyl chloride resin, a carbon monoxide ethylene copolymer and other additives with the carbon monoxide-ethylene copolymer being used at only 0.2-10 wt % as a processing aid. The intent of this patent publication is merely to improve the heat deformation of "plasticizer-free" polymers of relatively high average molecular weight for forming operations at relatively high temperatures. This German reference, in essence, teaches that the polyketone additive used therein gives an increase in the Tg which is the opposite of a plasticizing effect. This patent publication also mentions the carbon monoxide-propylene copolymer in a prophetic sense but does not demonstrate that such a copolymer was made or blended with polyvinyl chloride. In fact, as indicated in Comparative Example 5, below, a duplication of Example 15 of more recent U.S. Pat. No. 4,824,934 which mentions the carbon monoxide-propylene copolymer yielded an oil as the product having ester and ether functionality.

SUMMARY OF THE INVENTION

The present invention relates to use of a carbon monoxide-propylene copolymer as a polymeric plasticizer for polyvinyl chloride.

DETAILED DESCRIPTION OF THE INVENTION

The terminology "plasticizer" and its grammatical variants, as used herein, is used in the broad sense of denoting a drop in the Tg of the polymer to which the instant plasticizer is added. While this, in itself, is a useful effect, the term, in a preferred embodiment herein where an additional external plasticizer is also used, is intended to connote the additional effect of lowering the hardness (increasing the flexibility) of the polymeric system. Reference is made to "Principles of Plasticization" by E. H. Immergut et al., Advances in Chemistry Series 48, American Chemical Society, 1964, page 1 and following.

The term "polyvinyl chloride" as used herein is intended to cover those homo- and copolymer resins of vinyl chloride known to persons of ordinary skill in the art. Generally speaking, copolymers of vinyl chloride containing up to about 20% of such monomers as vinyl acetate, propylene ethylene, butyl vinyl ether, diethyl maleate, dimethyl fumarate, and other ethylenically unsaturated monomers are intended to be covered. The amount of polyvinyl chloride which can be used in conjunction with the carbon monoxide-propylene copolymer to be described below can range from about 90% to about 30% by weight of the entire blend.

The carbon monoxide-propylene copolymer used herein is readily synthesized from carbon monoxide and propylene using the technique mentioned in European Patent Publication No. 301,664 (and illustrated in Examples 6-9 which follow) utilizing a catalyst system based on a palladium compound, an acid with a pKa of less than 6, and a bidentate compound of arsenic, antimony, phosphorus, or nitrogen. The carbon monoxide-propylene copolymer which is formed is one which is substantially free of ether and ester linkages. It can be used as a plasticizer at from about 5% to about 40% by weight of the blend containing the polyvinyl chloride resin, carbon monoxide-propylene copolymer, and any other additives that might be present.

Since the carbon monoxide-propylene copolymer described herein has good solubility in many common organic solvents, unlike the carbon monoxide-ethylene copolymer known to the prior art, it can be used as a plasticizer in situations where the polyvinyl chloride is dissolved in an organic solvent for solution casting of films, for example.

A preferred aspect of the present invention is to use the carbon monoxide-propylene polyketone material described hereinbefore (preferably a relatively low molecular weight liquid polymer) with a smaller amount (e.g., 1% to about 50%, by weight of the entire blend) of an external plasticizer for PVC, such as the dialkyl phthalates, to increase the flexibility of the polymeric system. This external plasticizer can be selected from those conventionally used in the art. It is preferred to used an amount of plasticizer which is below about 15%, by weight of the entire composition as compared to a 30%-50% range for external plasticizer as conventionally employed.

It is within the contemplation of the present invention that the compostions described herein could also contain another polymeric additive which functions as a so-called "internal plasticizer" for the polymer.

The instant invention is further illustrated by the Examples which follow.

EXAMPLE 1

Carbon monoxide/propylene copolymer (Tg=15° C.), 0.5 gm, was dissolved in 5 ml of tetrahydrofuran (THF) and was combined with a solution of 2 gm of PVC (GEON 102 brand) in 10 ml of THF. The solution was then poured on glass coated with TEFLON fluoropolymer and was allowed to dry overnight. The film was then separated from the coated glass and dried under vacuum at 60° C. A substantially transparent film having a thickness of 0.2 mm was prepared in this manner. Using optical microscopy no phase separation was detected in the film. The film was very flexible.

EXAMPLE 2

Carbon monoxide/propylene copolymer (Tg=15° C.), 1.5 gm, was mixed with 6 gm of GEON 102 brand PVC, and the mixture was dissolved in 45 ml of THF. The solution was poured on a glass plate and the film was dried as in Example 1. The film thickness was 0.3 mm. Glass transition temperature (Tg) of the film was 38° C. The presence of some volatile material was detected in the dry film by thermogravimetric analysis(TGA). The film was very flexible.

EXAMPLE 3

Carbon monoxide/propylene copolymer (Tg=15° C.), 0.67 gm, was mixed with 6 gm of GEON 102 brand PVC, and the mixture was dissolved in 45 ml of THF. The solution was poured on a coated glass plate, and the film was dried as in Example 1. The film thickness was 0.3 mm. The Tg of the film was 39.9° C. Volatile material was detected as in Example 2, and the film was very flexible.

COMPARATIVE EXAMPLE 4

GEON 102 brand PVC (6 gm) was dissolved in 45 ml of THF. The solution was poured on a coated glass plate, and the film was dried as in Example 1. The film thickness was 0.1 mm. The Tg of the film was 53.9° C.

COMPARATIVE EXAMPLE 5

This Example was an essential duplication of the work described in Example 15 of U.S. Pat. No. 4,824,934. It was done at ten times the scale of that Example.

Copper para-tosylate (0.5 gm) was placed in a flask. Into a separate flask was placed 0.22 gm of palladium acetate and 0.46 gm of bis(diphenyl-phosphino)propane. The foregoing compounds were then dissolved in 500 ml of methanol and were rapidly placed in an autoclave. The solution was degassed as described in Example 1. To the degassed solution was added 300 ml of propylene. The reactor was then pressurized to 50 bar with carbon monoxide and the temperature was raised to 85° C. The mixture was stirred for four and one-half hours and then it was cooled to room temperature and the pressure was released. The solvent was removed under vacuum. The product was a non-viscous oil with inorganic solids suspended in it. After filtration through silica gel it was a yellow oil. The presence of ester and ether functionalities was indicated in the $^{13}$C NMR spectrum by peaks of $\delta 176$, $\delta 174$, $\delta 173$, $\delta 73$, or $\delta 56$.

The Comparative Example illustrates that a carbon monoxide-propylene copolymer is not achievable using the above-mentioned prior art teaching.

EXAMPLE 6

This process is a modification of the process shown in European Patent Publication No. 301,664.

The catalyst used in this Example was prepared by placing 0.22 gm of palladium acetate, 0.43 gm of para-toluenesulfonic acid, and 0.44 gm of 1,3-bis(diphenylphosphino)propane in a flask equipped with a stir bar. To this was added 20 ml of dry acetone and 14 ml of dry acetonitrile. The mixture was then stirred for ten minutes at room temperature followed by warming to 50° C. for five minutes. This resulted in a clear yellow solution which was cooled to 30° C. followed by removal of the solvent under vacuum. The product was a yellow solid.

An autoclave was charged with 1 liter of dry acetone at room temperature. The catalyst prepared above was then dissolved in 20 ml of dry acetone and added to the autoclave. The solution was degassed by pressurizing with 4 bar nitrogen followed by release of the pressure, repeating this ten times. The reactor was then charged with 500 ml of liquid propylene. The solution was then warmed to 70° C. and then pressurized to 85 bar with carbon monoxide. The solution was stirred for seventeen hours during which time the pressure dropped to 65 bar. The solvent was removed under vacuum. The product was an oil which flowed easily at room temperature. In the $^{13}$C NMR spectrum there were no peaks at: $\delta 176$, $\delta 174$, $\delta 173$, $\delta 73$, or $\delta 56$ which indicated the absence of ester or ether functionalities. This is in contrast to Comparative Example 5, above.

EXAMPLE 7

The catalyst was prepared in the same fashion as in Example 1 above. The autoclave was charged in the same fashion as in Example 1 above. The only differences were that the initial pressure was 80 bar, the final pressure was 68 bar, and the temperature was 45° C. The solvent was removed under vacuum to leave 154 gm of product. This product was an oil which could be made to flow only upon heating.

EXAMPLE 8

The catalyst was prepared in the same fashion as in Example 1 above. The autoclave was charged in the same fashion as in Example 1 above. The only differences were that the initial pressure was 57 bar, the final pressure was 46 bar, and the temperature was 30° C. The solvent was removed under vacuum to leave 144 gm of product. The product was a tacky solid.

EXAMPLE 9

The catalyst was prepared in the same fashion as in Example 1 above. The autoclave was charged in the same fashion as in Example 1 above. The only differences were that the initial pressure was 65 bar, the final pressure was 8 bar, the time was 118 hours, and the temperature was 30° C. The solvent was removed under vacuum to leave 290 gm of product. The product was a solid elastomer having good mechanical strength. It has a Tg of 15° C. This compound forms a miscible blend with polyvinyl chloride.

EXAMPLES 10-13

A mixture of the components listed below was prepared and was then fed into a PLASTICORDER melt-blending apparatus, having a cavity of 60 gm, at 160° C. The mixture was fluxed for 10-15 minutes and was then removed from the apparatus and compression molded into films or panels. All values given in the Table below are % by weight based on the entire weight of the formulation.

| Component | 10 | 11 | 12 | 13 |
| --- | --- | --- | --- | --- |
| PVC Resin | 60.3 | 60.3 | 69.5 | 50.0 |
| POK (liq)* | 25.9 | 25.9 | — | — |
| POK (solid)** | — | — | 23.2 | 42.5 |
| Tin stabilizer (T-31) | 3.4 | 3.4 | — | — |
| Di(stearyl)pentaerythritol diphosphite | 0.3 | 0.3 | — | — |
| octadecyl 3-(3',5'-di-tert-butyl-4'-hydroxy-phenyl) propionate | 0.3 | 0.3 | 0.2 | 0.2 |
| Calcium stearate | — | — | 0.5 | 0.5 |
| Dioctyl phthalate | — | 8.6 | — | — |
| Epoxidized soybean oil (Paraplex G-62) | 8.6 | — | 3.5 | 3.3 |
| Lubricant (Wax OP) | 0.5 | 0.5 | — | — |
| Glyceryl monostearate | 0.5 | 0.5 | — | — |
| Barium/Cadmium Stabilizer (SYNPRON 1517) | — | — | 2.8 | 3.0 |

-continued

| Component | 10 | 11 | 12 | 13 |
|---|---|---|---|---|
| Stearic acid | — | — | 0.5 | 0.5 |

*comprised a linear alternating carbon monoxide/propylene polyketone (POK) of about 1,000 molecular weight.
**comprised a linear alternating carbon monoxide polyketone (POK) of about 10,000 molecular weight.

The Shore "A" hardness (ASTM D2240) and hexane extractibles (wt % loss POK and additional plasticizer after two hours in hexane) were as follows:

| Example | Shore "A" Hardness | Hexane Extr. |
|---|---|---|
| 10 | 89.6 | 0.20 |
| 11 | 84.6 | 0.36 |
| 12 | 97.7 | — |
| 13 | 98 | — |

The hexane extractibles weight loss of plasticizer from conventionally plasticized PVC generally runs in the range of 70%-80%.

The above Examples illustrate that plasticization was achieved when traces of solvent, such as THF, were left in the blend (See Examples 1-3). When the PVC was mixed with the same carbon monoxide/propylene high molecular weight (Tg=15°) copolymer, no plasticization, in the sense of flexibility improvement, occurred without the additional presence of the external plasticizer (Examples 12-13). This demonstrates that the high molecular weight polyketone described for use herein functions as a plasticizer for flexibility enhancement only in the presence of a second, external plasticizer such as dioctyl phthlate. It has also been found that the amount of such external plasticizer which needs to be used to provide a certain degree of flexibility is greatly reduced when a polyketone of low molecular weight is used as the primary flexibilizing component (Example 11). This is an unexpected and important finding which is quite valuable because flexibility can be provided to a vinyl chloride polymer without harming permanency.

The foregoing Examples have been set forth to illustrate certain embodiments of the present invention and should not, for that reason, be construed in a limiting sense. The scope of protection sought is set forth in the claims which follow.

We claim:

1. A plasticized polyvinyl chloride (PVC) resin composition containing a liquid carbon monoxide-propylene copolymer as a plasticizer.

2. A composition as claimed in claim 1 wherein the PVC is present at from about 30% to about 90%, by weight.

3. A composition as claimed in claim 2 wherein the carbon monoxide-propylene copolymer is present at from about 5% to about 40% by weight.

4. A composition as claimed in any of claims 1-3 which is formed by dissolving the polyvinyl chloride resin and carbon monoxide-propylene copolymer in an organic solvent.

5. A plasticized polyvinylchloride (PVC) resin composition which contains a carbon monoxide-propylene copolymer and an external plasticizer, as the plasticizer, for the PVC.

6. A composition as claimed in claim 5 wherein the external plasticizer is present at from about 1% to about 50%, by weight of the composition.

* * * * *